Oct. 15, 1935.   R. THOMAS   2,017,575
LIGHT SOURCE FOR PROJECTORS
Filed Dec. 5, 1933
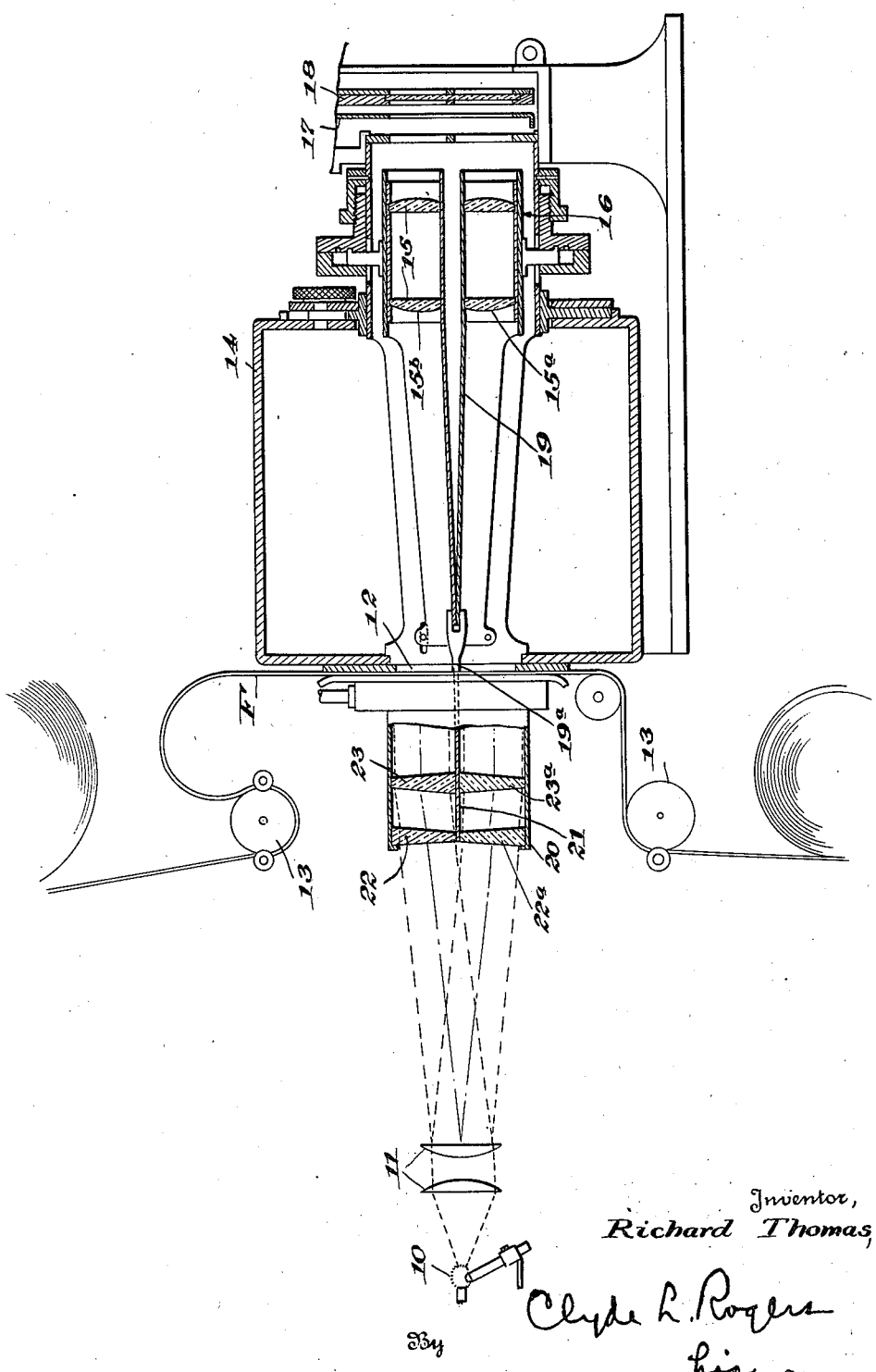
Inventor,
Richard Thomas,
By Clyde L. Rogers
his Attorney Patented Oct. 15, 1935

2,017,575

UNITED STATES PATENT OFFICE 2,017,575

LIGHT SOURCE FOR PROJECTORS

Richard Thomas, Los Angeles, Calif., assignor of one-half to Wm. Jennings Bryan, Jr., Los Angeles, Calif.

Application December 5, 1933, Serial No. 700,983

5 Claims. (Cl. 88—16.4)

My invention relates to a projector system, and more particularly to a projector adapted to simultaneously project light rays through a pair of adjacent film images, and comprises a novel beam-splitting device wherein a single light source can be used, the rays from this light source being formed into a pair of identical beams moving respectively through the film images.

When simultaneously projecting beams of light through two adjacent film images, difficulty is encountered in forming a satisfactory light source. If a single source is utilized, it has heretofore been necessary to form a beam of light of sufficient dimension to cover both film images which are being simultaneously projected. Such a system is not only wasteful of light in view of the fact that the beam is not of rectangular cross-section, but in addition the adjacent portions of the film images will ordinarily receive more light than the outer portions of these images. The result is that when attempting to superimpose the constituent images on a screen, one portion of one constituent image will be brighter than the corresponding portion of the other constituent image. Similarly, if two light sources are utilized, these sources respectively directing beams through the film images, difficulty is encountered in maintaining the intensity of the two sources equal.

Furthermore, if color filters are positioned in the beams respectively passing through the two color-value images and which beams form the composite screen image, I have found that a very noticeable color beat is formed at the upper and lower portions of the projected image. If not eliminated, this factor will prevent the formation of satisfactory color pictures by the additive process. The light source is instrumental in forming or eliminating this color beat. This is especially true when a single-advance system is used, the film being advanced only one frame at a time so that each color value image is twice projected, once through the upper aperture and once through the lower aperture. If the light rays passing through the upper portion of the upper aperture are of different intensity than those passing through the upper portion of the lower aperture, it is clear that the screen images projected at different instants of time will pulsate in intensity at one end thereof. Similarly, if the light rays passing through the lower portion of the upper aperture are of different intensity than those passing through the lower portion of the lower aperture, the screen images successively projected will pulsate in intensity at the opposite end. In black-and-white projection this may merely create a flicker, but in color projection through filters the result is a distinct color beat at these ends of the projected images.

It is an object of the present invention to provide improved means to eliminate such flicker and color beat by forming beams of substantially identical character and intensity, these beams passing through the film images to be projected.

With either of the systems above described difficulty is experienced not only in equalizing the intensities of corresponding portions of the two beams, but difficulty is often experienced with the discoloration of certain of the light rays. Almost all light sources emit rays of light which vary slightly in color, depending upon which portion of the source they emanate from. This is especially true of an arc, for the beam of light produced by such an arc varies quite markedly in color. The light rays produced by the outer portions of the arc may be of a distinctly different color from the rays produced by the most intense central portion of the arc.

Such discoloration is extremely detrimental in the projection of colored motion pictures, especially when a composite image is being formed on a screen by the use of a pair of film images. If an attempt is made to use a single light source and to form a beam of light of sufficient dimension to cover both film images, the rays passing through the outer portion of one film image may be of quite a different color from the rays passing through the corresponding outer portion of the other film image. Further, in attempting to superimpose the resulting images on a screen a distinct variation in color will appear. If the film images are exposed through a set of color filters so that these images comprise color-value images, and if filters are used in the projection beams to form a composite color image on the screen, it will be found that the discolored light rays prevent the reproduction of true color values. These discolored light rays introduce into the system colors which do not appear in the original object as photographed and are very detrimental in the projection of color images.

It is an object of the present invention to provide improved apparatus for producing a pair of identical light beams respectively passing through a pair of film images, so that any discoloration due to the light source and which appears in a given portion of one film image will also appear in a corresponding position on the other film image.

It is a further object of the present invention to provide improved apparatus for utilizing a single light source, and, in effect, to split the beam of light formed thereby into two adjacent beams of identical character, these beams moving respectively through the film images being projected.

A further feature of the invention lies in the particular structure utilized for forming these identical beams, and in the utilization of a septum means for completely separating the beams, thus preventing cross rays from one beam to the other.

Another object of the present invention is to provide an improved light source sending rays through a pair of film images, and in which the most intense rays (if the rays are not of equal intensity through all portions of each film image) will always be in corresponding positions with the two frames. This is particularly valuable if an arc is used, for as the carbons burn away the crater from which the most intense rays emanate moves relative to the apertures through which the film images are being projected. In my system the most intense rays emanating from this crater will at all times pass through corresponding portions of the apertures or film images so that movements of the light source will not detrimentally affect the system.

The invention wil be better understood from the following detailed description taken in connection with the accompanying drawing and the distinctive features of novelty will be thereafter pointed out in the appended claims.

Referring to the drawing:

The figure illustrates diagrammatically and in longitudinal vertical section a projection apparatus equipped with the improved beam splitting device of my invention.

10 indicates a suitable light source shown as an arc, and 11 denotes a condenser unit adapted to direct a beam of light toward the double film apertures of a double aperture film plate 12 over which the film F is directed and drawn by a usual systems of rollers 13. 14 denotes the housing of the projector apparatus to which the aperture plate 12 is secured and 15 denotes the front lens system of the projector suitably mounted in an adjustable barrel housing 16. 17 denotes a portion of a shutter device, and 18 a portion of a color screen. The projector apparatus embodying these features may be the same as, or generally similar to that described and shown in the patent to William M. Thomas No. 1,985,470, patented December 25, 1934. Similarly as in said patent, the front projector lenses comprise a double lens system 15a, 15b separated by an expansive septum device 19, this septum device extending rearwardly to the locality of the aperture plate 12 at the line of division between the two film apertures, as seen at 19a. In carrying out my invention, I provide a housing 20 extending rearwardly of the aperture plate 12 and with a septum plate 21 extending lengthwise through the middle thereof. A pair of prisms 22, 22a are mounted in the outer end portion of this housing, these prisms being as shown of isosceles trapezoidal form and mounted apex to apex against the septum plate 21. The action of these prisms is to deflect outward or spread with respect to each other the two portions of the light beam falling thereupon. In the housing 20 and spaced forward of the prisms 22, 22a, I mount a second pair of prisms 23, 23a also of isosceles trapezoidal form but mounted base to base against the septum plate. This second pair of prisms is selectively spaced from the prisms 22, 22a according to the degree of spreading or separation of the two light beams that is required for proper and correct superimposition of the picture images one upon the other, it being understood that if the prisms 23, 23a are spaced farther forward from the prisms 22, 22a the two beams will be spread correspondingly more than if the prisms 23, 23a are located closer to the outer pair of prisms 22, 22a. The action of the second pair of prisms 23, 23a is to bend the beams of light inward toward each other so that as they are projected therefrom upon the film images they are in approximate parallelism. The two beams of light which are projected upon the two picture images located in the double film apertures of the aperture plate 12 may thus be separated exactly the right amount for correct spacing to illuminate all portions of both images equally and adequately.

I am aware that the invention may be embodied in other specific forms without departing from the spirit or essential attributes thereof, and I therefore desire the present embodiment to be considered in all respects as illustrative and not restrictive, reference being had to the apended claims rather than to the foregoing description to indicate the scope of the invention.

I claim as my invention:

1. A projector apparatus comprising a light source, a condenser unit, and a beam spreading device embodying a pair of prisms mounted apex to apex in position to receive the light beam from said condenser unit, said prisms being of truncated isosceles form with their base axes in the same plane, and a second pair of similar prisms mounted base to base with their base axes in the same plane, and selectively spaced from the first pair of prisms according to the desired spreading of the light rays, said second pair of prisms adapted to change the direction of the light rays into approximate parallelism.

2. A projector apparatus embracing a light source, a condenser unit, and a beam spreading device comprising a pair of adjacent symmetrical refracting elements adapted to separate the beam of light from the condenser into two equal parts and to spread the parts of such beam, a second pair of symmetrical refracting elements selectively spaced from the first pair adapted to receive the spread rays of the two parts of the beam and to direct the same to substantial parallelism, a double aperture projection plate in position to receive the two parts of the beam, and a septum extending from between the elements of said pairs of refracting elements to said aperture plate.

3. A projector apparatus as set forth in claim 2 wherein said pairs of elements are mounted in selectively spaced relation in an enclosing shell with the septum device extending therebetween and lengthwise through said shell.

4. A projector apparatus embracing a light source, a condenser unit, and a beam spreading device comprising a pair of symmetrical prisms mounted apex to apex in position to receive the light beam from said condenser unit, a second pair of symmetrical prisms mounted base to base and selectively spaced from the first pair of prisms according to the desired spreading of the light rays, said second pair of prisms adapted to change the direction of the light rays into approximate parallelism, a double aperture projection plate in position to receive the two parts of the beam, and a septum extending from between the prisms of said pairs of the prisms to said aperture plate.

5. A projector apparatus as set forth in claim 4 wherein the prism elements of each pair of prisms are of isosceles trapezoidal form and enclosed in a shell mounting with the septum extending between the prism elements of each pair and through said shell.

RICHARD THOMAS.